June 2, 1953    R. F. MORRISON    2,640,446
CANDYMAKING APPARATUS
Filed Aug. 11, 1947    8 Sheets-Sheet 2

Fig. 8

June 2, 1953 R. F. MORRISON 2,640,446
CANDYMAKING APPARATUS
Filed Aug. 11, 1947 8 Sheets-Sheet 6

June 2, 1953 R. F. MORRISON 2,640,446
CANDYMAKING APPARATUS
Filed Aug. 11, 1947 8 Sheets-Sheet 7

Inventor:
Robert F. Morrison
By: Zabel and Fitzhaugh
Attys.

June 2, 1953 R. F. MORRISON 2,640,446
CANDYMAKING APPARATUS
Filed Aug. 11, 1947 8 Sheets-Sheet 8

Inventor:
Robert F. Morrison
By: Zabel and Fitzbaugh
Attys.

Patented June 2, 1953

2,640,446

UNITED STATES PATENT OFFICE 2,640,446

CANDYMAKING APPARATUS

Robert F. Morrison, Oak Park, Ill., assignor to Mars, Incorporated, Chicago, Ill., a corporation of Delaware Application August 11, 1947, Serial No. 768,025

3 Claims. (Cl. 107—22)

The present invention relates to the manufacture of candy in the form of pieces or bars, and particularly to certain apparatus for producing the candy in a continuous automatic operation. The candy progresses under controlled conditions from its ingredient stage in the candy mixers through separating, slicing, coating and chocolate enrobing stages to an automatic wrapping machine where the pieces or bars are then wrapped in paper. All of this is performed as a continuous controlled operation without the candy being touched by the human hand from the time the candy is first introduced into the batch mixers until the pieces or bars are in condition for wrapping.

For purposes of illustration the present invention will be described in connection with the preparation of a bar of candy of the type disclosed in Fig. 1. Such a bar comprises a layer of nougat 100 on top of which is disposed a layer of caramel 101 having a layer of nuts 102 thereon, which in turn are covered by a second layer of caramel 103. The entire bar is coated or enrobed with chocolate 104.

Figures 1, 2:
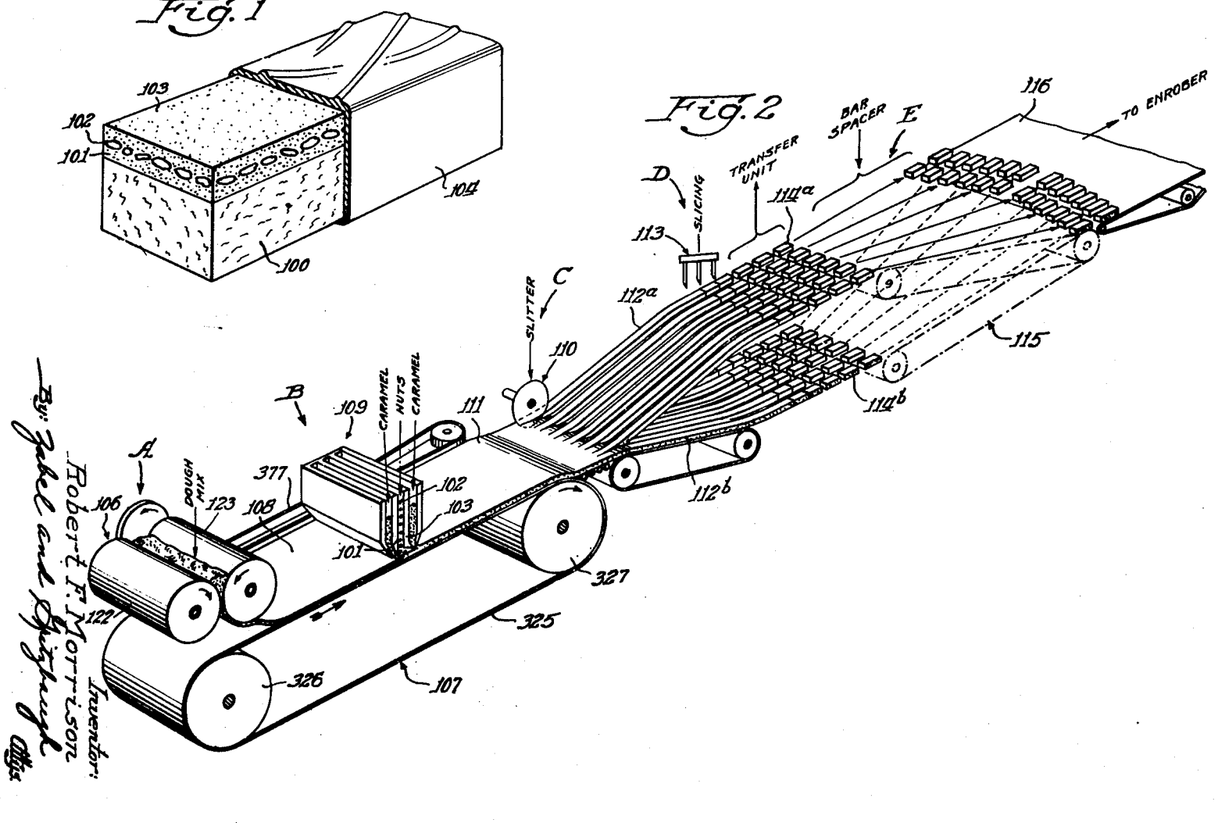
Fig. 1 is a perspective view showing a typical candy bar, with a portion of the chocolate coating removed, that can be made as disclosed hereinafter.
Fig. 2 is a more or less schematic view illustrating the various stages through which the candy passes when manufactured in accordance with the present method.

Referring to Fig. 2 bars of this type are manufactured continuously by a series of steps that are performed at various stations including stations A to E inclusive indicated in Fig. 2.

The equipment described herein can be used to make candy bars comprising a wide variation of ingredients put together in accordance with many different formulae, such for example as caramel, toffee, marshmallow and nougat, or a combination of these materials. Specifically speaking, the nougat is a batter-like mix made of aerated egg whites and a syrup of sugar, salt, water and corn syrup; and after thoroughly beating this mix to provide additional aeration, vegetable oil, malted milk and cocoa are added and all are thoroughly mixed together. This nougat mix or dough is introduced through a spreader device generally indicated at 106. The operation of spreading this nougat onto a conveyor 107 is accomplished at station A and the nougat thus spread takes the form of a relatively wide sheet 108 of nougat that is of a predetermined uniform thickness throughout its entire area. The conveyor 107 moves this sheet 108 of nougat in the direction indicated by the arrow in Fig. 2.

At station B the two layers 101 and 103 (see Fig. 1) of caramel with the layer of nuts 102 held therebetween are laid on top of the sheet of nougat 108 by means of a caramel and nut dispenser generally indicated at 109 (see Figs. 2 to 5 incl.). The moving conveyor 107 thereafter carries combined layers of nougat, caramel and nuts 100 to 103 inclusive, into a plurality of slitting knives generally indicated at 110 where at station C, the combined sheet 111 of nougat, caramel and nuts are slit lengthwise into ribbon-like strips of candy 112a and 112b, which are separated as shown in Fig. 2 into upper and lower strips.

As best shown in Fig. 2 the odd numbered strips, as for example, the first, third and fifth, etc. strips reading from right to left on the drawing are caused to travel downwardly and are identified as strips 112b whereas the even numbered strips, namely, the second, fourth, and sixth, etc., are caused to travel upwardly to an upper elevation and are identified as strips 112a. This vertical separation of the strips is brought about so as to space the candy a sufficient distance apart to prevent the strips from sticking together again after they have passed the slitting discs. The slitting discs do not remove any candy but merely slit and displace the candy in the separating operation. The strips are then cut into bar lengths, which operation is accomplished by means of a slicing machine generally indicated at 113 at station D. The bars thus cut are illustrated at 114a and 114b in Fig. 2, the former being disposed at the lower elevation. These spaced and cut bars 114a and 114b leaving the slicer 113 are deposited on bar transfer unit generally indicated by the legend Transfer Unit and are then returned to a common plane on conveyor 116 by means of a bar spacer generally indicated at 115 at station E. The bar spacer not only returns the bars 114a and 114b to a common plane but also spaces these bars so that they are deposited in the common plane with adjacent bars disposed at the proper distance apart for the chocolate enrobing operation to be performed. The bars leaving the slicer 113 are spaced apart endwise by the bar transfer unit that travels at a slightly greater speed than the speed of the conveyors moving the candy through the slicer. The conveyor 116 moves the bars to a chocolate coating or enrobing machine indicated at 117 in Fig. 3 from which the bars are conveyed through a suitable cooling chamber 118 and finally onto the bar wrapping equipment (not shown).

The nougat dough that is introduced onto the conveyor 107 at station A is necessarily warm and relatively soft so that the sheet 108 of nougat passing from station A to station B travels into a cooling chamber 119 (see Fig. 3) that chills and hardens to a certain extent the nougat preparatory to depositing the caramel and nut spread thereon at station B. Likewise the caramel and nut layer deposited at station B is warm and relatively soft and therefore the candy leaving station B is caused to travel through a cooling chamber 120 before the candy is brought to the slitters at station C.

It is an object of the present invention to provide means for manufacturing candy bars on a continuous basis without requiring the human hand to touch the candy. This is to be accomplished at a high rate of production of candy bars with provisions for changing the production rate in a very simple and quick manner.

The foregoing constitutes some of the principal objects and advantages of the present invention, others of which will become apparent from the following description and the drawings, in which.

One embodiment of the invention is shown for illustration, it being recognized of course that many modifications may be made in the form of the invention shown without departing from the intended scope of the invention.

Certain subject matter herein is disclosed and claimed in my prior co-pending applications Serial No. 762,145, filed July 19, 1947, now Patent No. 2,612,852, dated October 7, 1952, and Serial No. 739,869, filed April 7, 1947, now Patent No. 2,612,851, dated October 7, 1952.

Reference may be had to said patents for a complete disclosure of the details of the spreader equipment at station A, the caramel and nut dispenser at station B, the bar slicer at station D, and the bar spacer at station E.

The dough or nougat batch is first prepared and thoroughly mixed and whipped in one or more batch mixers or the like, and is then dumped into a hopper that includes a pair of spaced spreader rollers 122 and 123 and rotating end discs operating against the ends of said rollers that have chilled surfaces coming in contact with the candy dough, the forward disc being omitted in Fig. 2. The candy when first dumped into the hopper is relatively hot and is soft and sticky but upon coming in contact with the chilled rollers, a slightly hardened surface or skin is formed on those portions of the candy that engage the chilled rollers.

The candy dough is fed between the spaced spreader rollers and emerges from the rollers in the form of a flat strip that corresponds in width with the width of the rollers and in thickness with the distance between the rollers. This candy is deposited upon a moving belt conveyor and is conveyed away from the spreader rollers at a rate of speed corresponding to the speed at which the dough is discharged from the rollers.

It is important that this resulting sheet of nougat be of uniform thickness throughout its length and width. The hardened surface or skin formed by the chilled rollers on the sheet of nougat is disposed on the top, bottom and side faces of the sheet thus deposited upon the conveyor.

Figure 3:
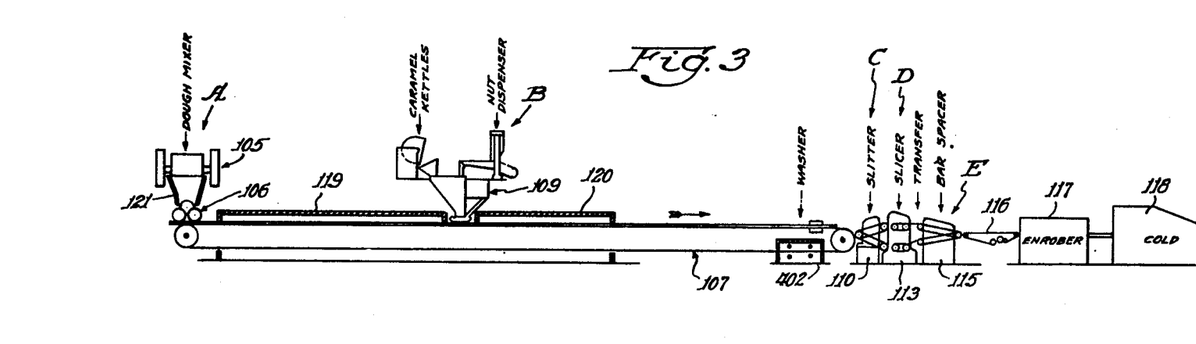
Fig. 3 is a diagrammatic view of the candy making machinery of which this invention is a part.
Figure 4:
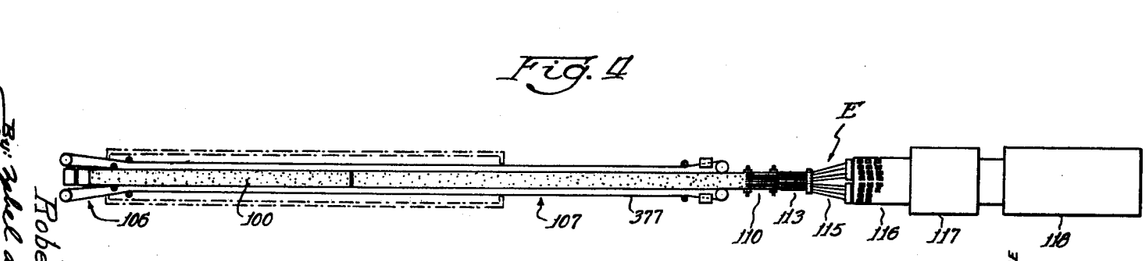
Fig. 4 is a plan view of the equipment shown in Fig. 3.
Figure 5:
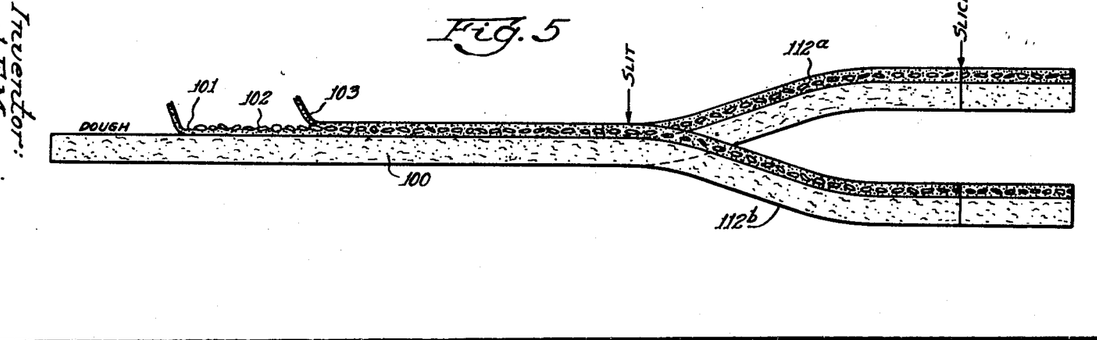
Fig. 5 is a more or less schematic side view of the candy illustrating the progress of the candy from the point where the dough is first spread out onto the conveyor until it is separated into ribbons and the ribbons separated and cut into bar lengths.

Referring to Fig. 3 the batch mixer 105 discharges its contents through a chute 121 into the spreader device generally indicated at 106. The spreader device forms the dough into the aforesaid continuous flat strip which is deposited on belt conveyor 107 (Figs. 2–4).

As diagrammatically shown in Figs. 2 and 3, the conveyor 107 comprises generally a conveyor belt 325 that operates about a pair of spaced drums or rollers 326 and 327.

At station B (Figs. 2 and 3) which is disposed intermediate the ends of the conveyor 107 is disposed the caramel and nut dispenser 109.

Figure 6:
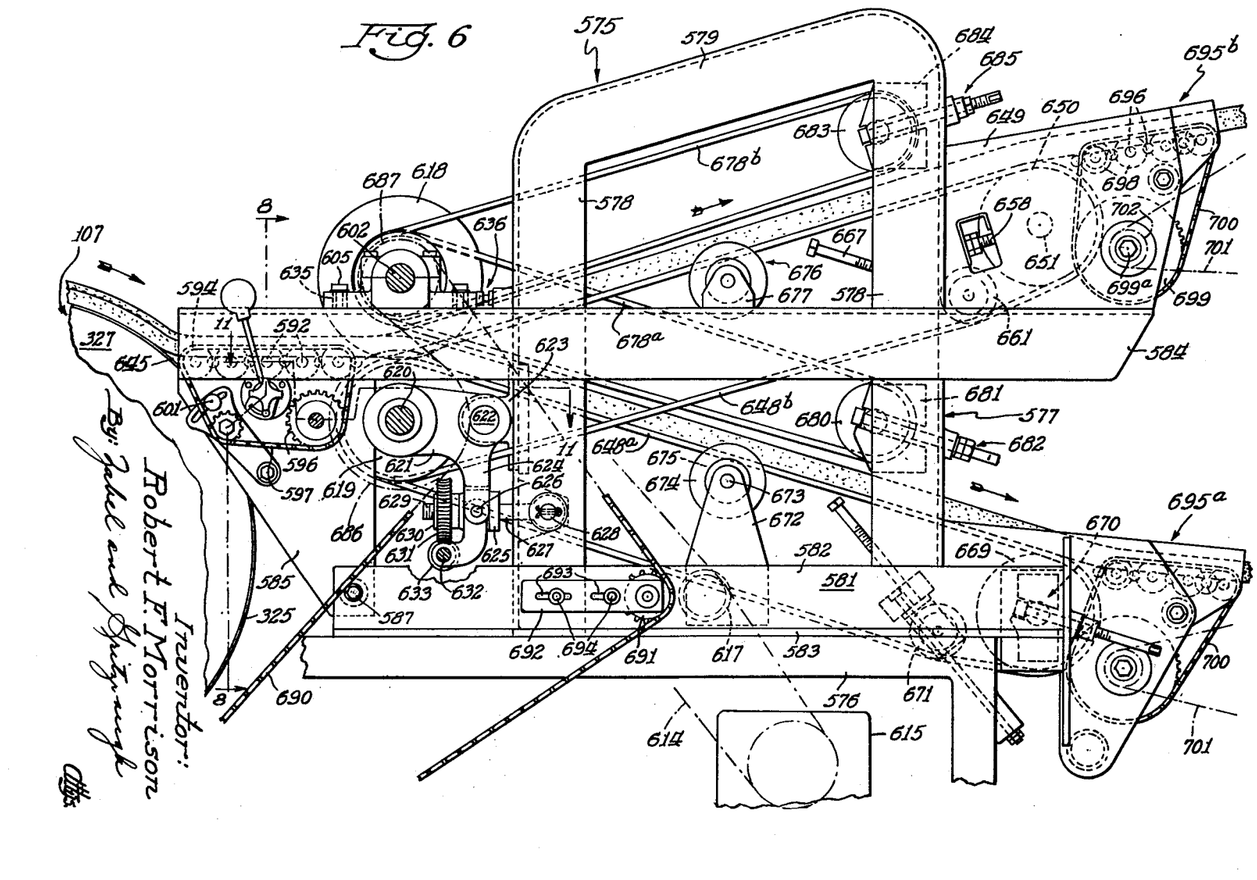
Fig. 6 is a side elevational view of the slitter and separator that slits the sheet of candy into ribbons and spreads the ribbons into upper and lower elevations.

From the cooling chamber 120 (Fig. 3) the combination nougat and caramel sheet of candy is conveyed to the slitter and separator indicated at station C in Fig. 2 and at 575 in Fig. 6.

Figure 7:
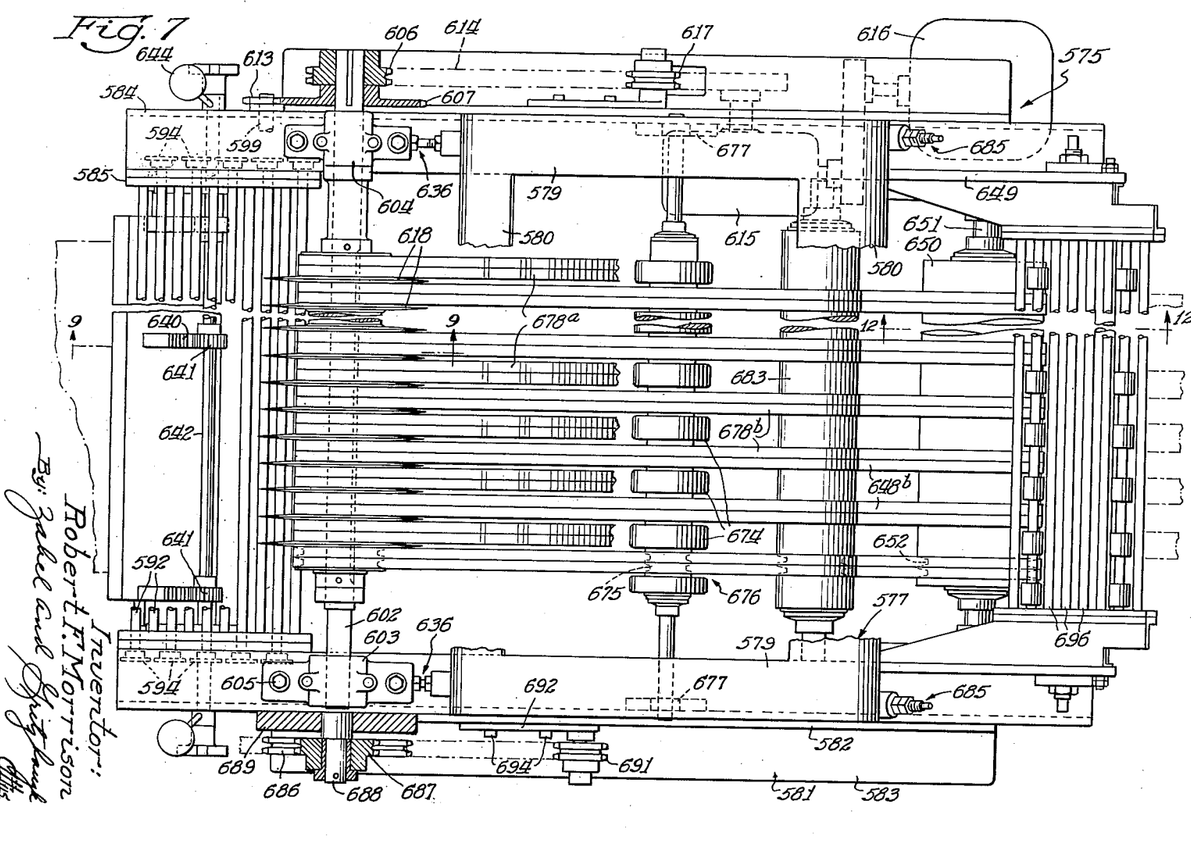
Fig. 7 is a plan view of the device shown in Fig. 6.

The details of the slitter and separator 575 are best shown in Figs. 6 to 13 inclusive. Referring to Figs. 6 to 9 inclusive the slitter and separator 575 is mounted on a base 576 and comprises generally a frame indicated at 577 that is mounted directly on the base 576 and includes upright legs 578 connected at their upper ends by side frame members 579 and forward and rear frame members 580 (Fig. 7). Adjacent to each side of the frame 577 and connected to the bottom of the legs 578 is an angle member 581. These angle members 581 are disposed in substantially horizontal spaced relationship and each comprises an upstanding web portion 582 and an outwardly projecting flange 583.

Figure 8:
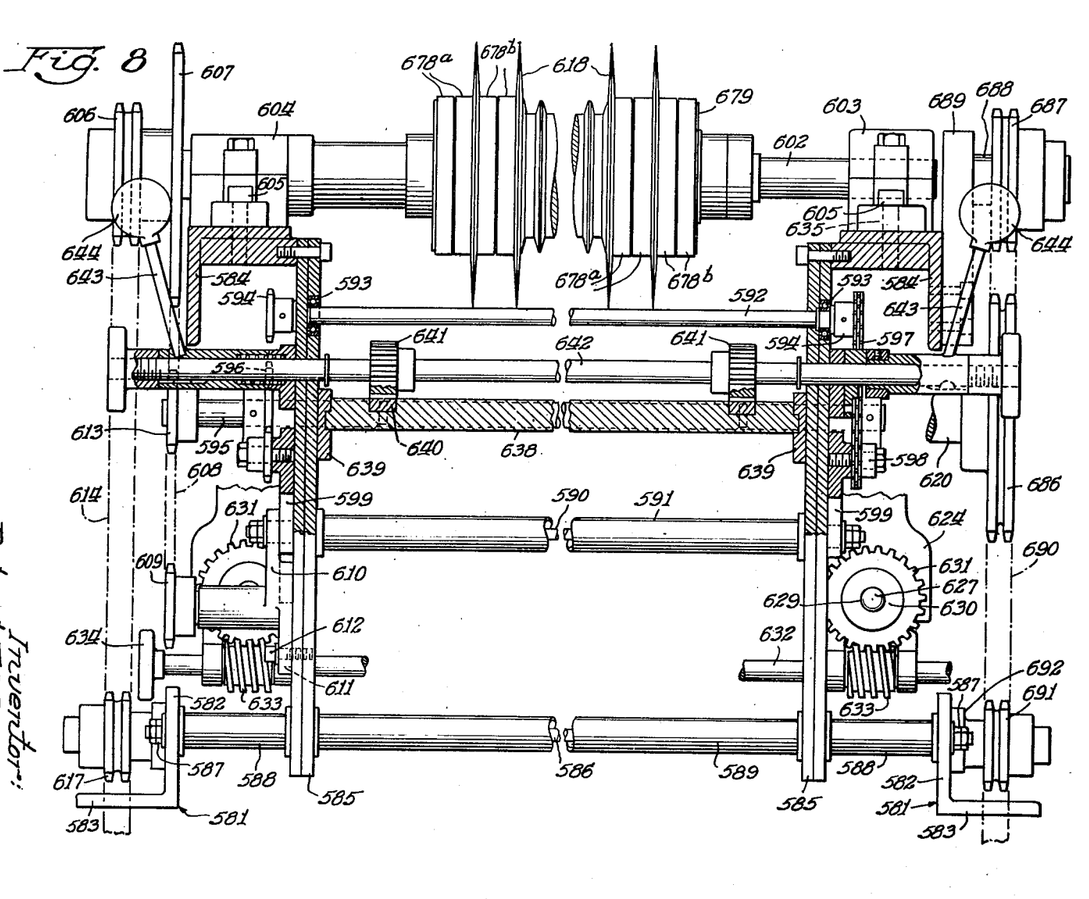
Fig. 8 is a vertical, sectional view taken through the slitter, the view being taken on the line 8—8 of Fig. 6.

As best shown in Figs. 6 and 7 the frame member 577 is spaced from the roller 327 but lies in the horizontal direction of the conveyor 107. The angle members 582 project forwardly with respect to the frame 577 (see Figs. 6 and 7) so as to span a substantial portion of the distance between the frame 577 and the adjacent roller 327 of the conveyor 107. Spaced above each of the angle members 581 and disposed in substantially parallel relationship therewith is an angle member 584 that is secured to the frame 577. These angle members 584 likewise extend beyond the forward edge of the frame 577 so as to span the distance between the frame 577 and the roller 327 of the conveyor 107. Thus there is provided a lower angle member 581 and an upper angle member 584 to each side of the frame 577 and to the forward ends of each pair of such lower and upper angle members is secured a vertically disposed plate member 584. Referring to Fig. 8 the plate members 585 are apertured through their adjacent lower edges to receive a rod 586 that extends between the spaced angle members 581 and is secured thereto by suitable bolts 587 that are threaded onto the ends of rod 586. Suitable spacer sleeves 588 are provided between the angle members 581 and the adjacent plate members 585 and a spacer sleeve 589 is provided between the pair of plate members 585 so as to fix the lower ends of the plate members 585 with respect to the angle members 581. These sleeves 588 and 589 are mounted over the rod 586. Disposed above the rod 586 is a second rod 590 that passes through the spaced plate members 585 and a spacer sleeve 591 is mounted over the rod 590 and serves to reinforce the plate members 585.

As best shown in Figs. 6 to 9 inclusive a plurality of horizontally spaced rotatable shafts serving as conveyor rollers 592 are mounted in bearings 593 (Fig. 8) in the spaced plate members 585. These rollers 592 are spaced relatively close together as indicated in Fig. 7 so as to form in effect a continuous conveyor that commences closely adjacent to the periphery of the roller 327 of conveyor 107 (Fig. 6) and extends horizontally in a direction toward the frame 577 of the slitter and separator 575. Each of the rollers 592 is provided on one of its ends with a sprocket wheel 594, and as shown in Fig. 7 the sprocket wheels 594 for the first, third, fifth, etc., rollers 592 are disposed at one side of the machine adjacent to one of the plate members 585, whereas the sprocket wheels 594 for the second, fourth, sixth, etc., rollers 592 are disposed at the other side of the machine adjacent to the other side of the plate member 585. In this manner adequate room is available for the sprocket wheels.

Figure 9:
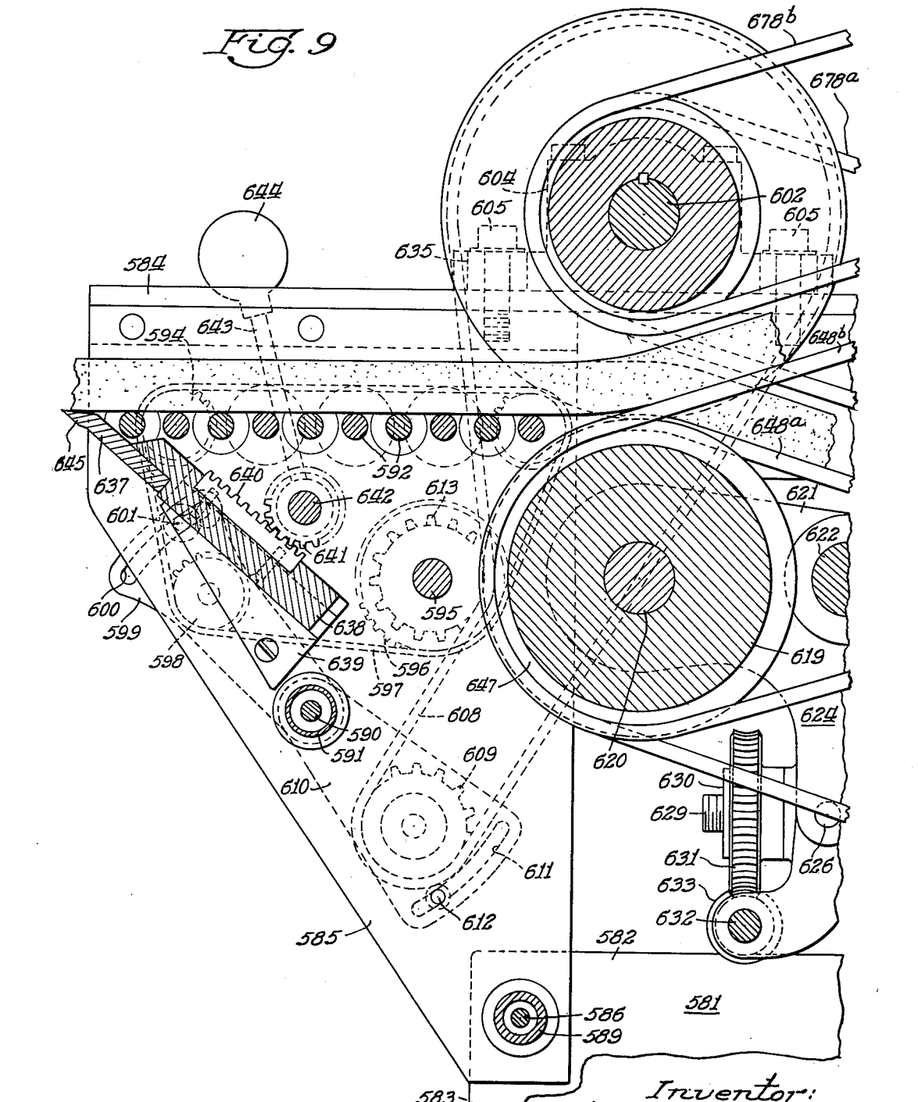
Fig. 9 is a longitudinal, sectional view taken through the slitter, the view being taken on the line 9—9 of Fig. 7.

Journalled in the plate members 585 and disposed below the rollers 592 is a collar shaft 595 that carries a sprocket wheel 596 adjacent to each end thereof. Thus there is provided a powered sprocket wheel 596 for each set of sprocket wheels 594. A sprocket chain 597 is provided for each set of sprocket wheels 594 and engages each of such sprocket wheels as best shown in Fig. 9 and likewise operates about the corresponding powered sprocket wheel 596. An adjustable idler sprocket 598 is mounted on an adjustable plate 599 that is pivotally mounted on an end of the rod 590 there being provided a plate 599 for each idler sprocket 598. The sprocket chain 597 operates about the idler sprocket 598. The free end of each plate 599 is provided with a slot 600 that is adapted to slide on a lug 601 so that the relative position of the idler sprocket 598 may be adjusted to take up slack in the sprocket chain 597. Means associated with the lug 601 are provided for locking the plate 599 in a selected position.

Supported on the spaced angle members 584 is a shaft 602 that is journalled adjacent to its opposite ends in bearings 603 and 604. Each of the bearings 603 and 604 is mounted on an angle member 584 and is bolted in place as by bolts 605. One end of the shaft 602 terminates at the bearing 603, while the opposite end of the shaft projects through the bearing 604 and is provided with a double sprocket wheel 606 on the end thereof. A second sprocket wheel 607 is mounted on the shaft 602 between the double sprocket wheel 606 and the bearing 604. Again referring to Figs. 8 and 9 a sprocket chain 608 is adapted to operate about the sprocket wheel 607 and likewise meshes with a sprocket wheel 613 that is mounted on the end of shaft 595. An idler sprocket 609 is journalled on a plate 610, this plate 610 being pivotally mounted on the end of rod 590. An arcuate slot 611 is provided in the plate 610 and is adapted to ride on a lug 612 so that the plate 610 may be pivoted about the rod 590 so as to adjust the position of the idler sprocket 609, the position of the plate 610 being fixed by locking means cooperating with the lug 612. The sprocket chain 608 operates about the idler sprocket 609 and the tension in the chain is adjusted by the position of the idler sprocket 609.

Thus the powered sprocket wheel 596 is rotated by the drive through sprocket chain 608 and sprocket wheel 613 so as to rotate the numerous rollers 592 through the operation of the sprocket chains 597. The sprocket chain 608 is powered through the sprocket wheel 607 by rotation of shaft 602. This rotation of shaft 602 is brought about by a double sprocket chain 614 that operates over the double sprocket wheel 606, this double sprocket chain 614 being powered through a speed reducer 615. The speed reducer 615 in turn is driven by a motor 616. The tension in the sprocket chain 614 is adjusted by an adjustable idler sprocket 617.

Figure 10:
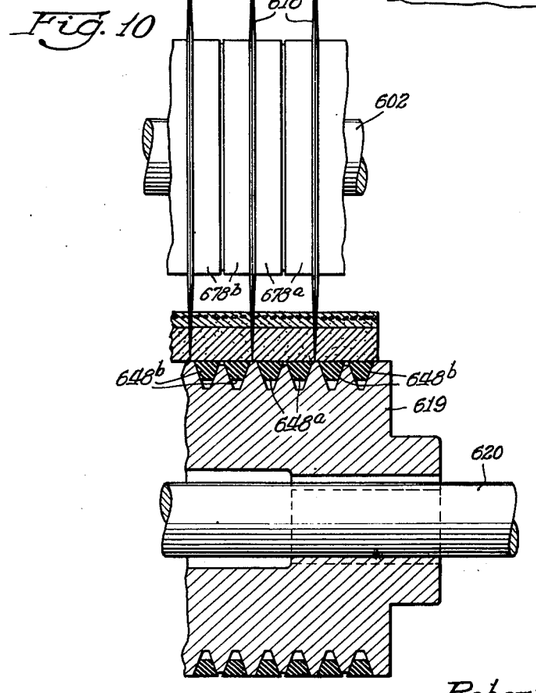
Fig. 10 is an enlarged, fragmentary view showing the relationship between the slitter discs and the drum against which they cut, the drum being illustrated partly in section.

As best shown in Figs. 6 to 10 inclusive a plurality of slitting discs 618 are mounted on the shaft 602 and are fixed to the shaft so as to rotate therewith. These slitting discs 618 are uniformly spaced apart along the shaft 602, their spacing being in accordance with the desired width of the strips or ribbons that are to be cut from the combination nougat and caramel sheet that is fed into the slitter and separator. Mounted directly below the slitting discs 618 is a cutting drum 619 that is mounted on a shaft 620. This shaft 620 is journalled at its opposite ends in plate members 621, each of which plate members 621 is pivotally mounted as at 622 (see Fig. 6) on a bracket 623 that is carried on the frame 577. The plate member 621 has a downwardly projecting arm 624 that is bifurcated to receive a collar 625, the arm 624 being pivotally mounted as at 626 on the collar 625. Passing through the collar 625 is a stud shaft 628 that is pivoted at one end at 627 on the horizontal shaft and is threaded as at 629 on the other end thereof. Threaded onto the end 629 of the stud shaft 628 is a rotatable collar 630 that carries a worm wheel 631. Disposed below the worm wheel 631 is a rotatable shaft 632 that is supported in the plate member 585 (see Fig. 8) and carries a pair of worms 633, one being disposed in operative relationship with each of the worm wheels 631. The worms 633 are fixed with respect to the shaft 632 so that upon rotation of shaft 632 both worms 633 drive the worm wheels 631. A hand knob 634 is mounted on one or both ends of the shaft 632 and is adjustable for hand manipulation from the side of the device. Thus by rotating the hand knob 634 both worm wheels 631 are rotated through the worms 633 so as to move the collar 630 longitudinally along the stud shaft 628. This motion of the collar 630 along the stud shaft 628 causes the cutting drum 619 to move toward or away from the slitting discs 618 so as to permit adjustment of the position of the cutting drum 619 with respect to the slitting discs 618. As best shown in Fig. 10 it is desirable that the cutting edge of the discs 618 be in engagement with the periphery of the cutting drum 619. The drum 619 may be made of aluminum or some such material, whereas the slitting discs 618 are made of steel so that in practice it may be advisable for the slitting discs 618 to actually cut into the surface of the cutting drum 619.

The bearings 603 and 604 (Figs. 6 to 9 inclusive) as previously mentioned are mounted on the angle framing members 584 and are actually bolted in place as at 605. Each of the bolts 605 passes through an enlarged hole 635 in its respective bearing member so that the position of both bearing members 603 and 604 may be adjusted longitudinally along the angle framing members 584. Thus the position of the slitting discs 618 over the cutting drum 619 may be adjusted and adjustable stop members 636 (Figs. 6 and 7) may be provided to assist in locking the bearing members in place after this adjustment has been made.

As shown in Fig. 6 the rollers 592 at the forward end of the slitter and separator 575 are disposed closely adjacent to the roller 327 at the exit end of the conveyor 107. When the leading edge of a sheet of candy is first conveyed from the conveyor 107 onto the slitter and separator 575 it is necessary to direct the leading edge onto the rollers 592 and for this purpose a feeder strip 637 (see Fig. 9) is provided. This feeder strip 637 is disposed crosswise between the spaced plate members 585 (Fig. 8) and is mounted on a slidable plate 638. This plate 638 is slidably mounted in spaced grooved members 639 that are mounted on the plates 585. As best shown in Fig. 9 the slidable plate 638 is provided with a rack 640 that engages a pair of pinions 641 (Figs. 8 and 9), which pinions 641 are mounted on a rotatable shaft 642 that is journalled in the spaced plates 585. An operating lever 643 is fixed to the shaft 642 and is provided with a knob 644 on its upper end. Thus by moving operating lever 643 in a clockwise direction (see Fig. 9) the feeder strip 637 is moved upwardly and is provided with a spanning portion 645 that spans the distance between the first roller 592 and the periphery of the belt conveyor 107 (see Fig. 6). After the leading edge of the candy strip has been moved on the rollers 592 the operating lever 643 can be rotated into a counterclockwise direction so as to lower the feeder strips 637 to an out-of-the-way position.

Figure 11:
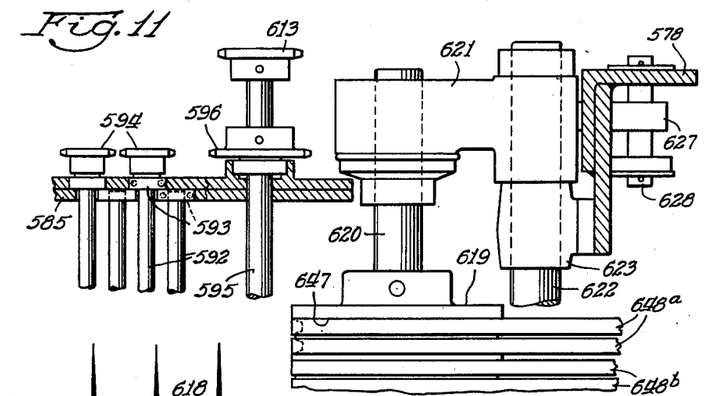
Fig. 11 is an enlarged, horizontal sectional view taken along the line 11—11 of Fig. 6.
Figure 12:
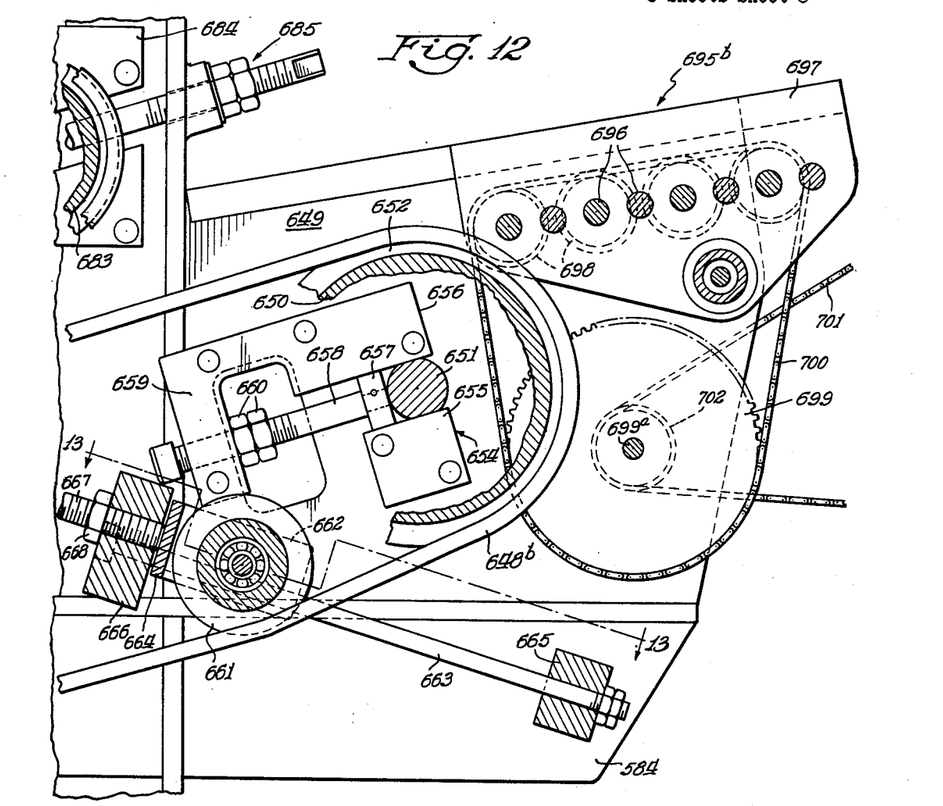
Fig. 12 is an enlarged, vertical sectional view taken along the line 12—12 of Fig. 7.

Referring now to Figs. 6, 9 and 11 the cutting drum 619 is provided with grooves 647 throughout its length so as to provide pulleys for a plurality of pairs of V-belts 648a and 648b. At the right hand end of the angle members 584 (see Figs. 6, 7 and 12) are upstanding upright supporting plates 649 between which is mounted a drum 650. This drum 650 is mounted on a shaft 651 and is grooved as at 652 to accommodate the pairs of belts 648b. Thus these pairs of belts 648b are adapted to operate about the lower and upper drums 619 and 650 respectively. As best shown in Fig. 12 the shaft 651, upon which is mounted the upper drum 650 is supported in adjustable bearings, one of which is generally indicated at 654. Each of these bearings 654 comprises spaced bearing members 655 and 656, both of which are stationary, and an adjustable bearing portion 657. This adjustable bearing portion 657 is mounted on the end of an adjustment screw 658 that is carried in an arm 659 that is formed as an integral part of the upper bearing portion 656. Adjustment nuts 660 fix the relative position of the movable bearing portion 657 so that the spacing of the shaft 651 with respect to the shaft 620 (see Fig. 6) can be adjusted by manipulation of the adjusting screw 658 and the locking nuts 660.

Figure 13:
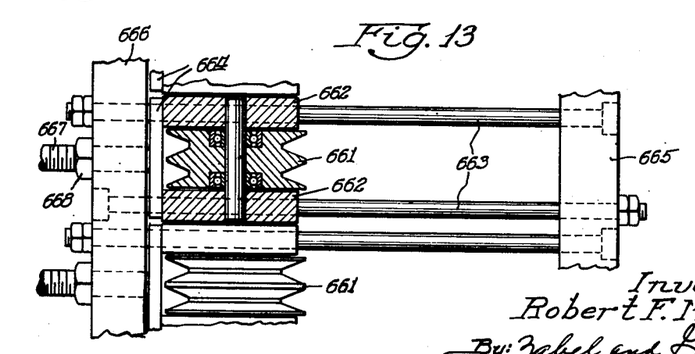
Fig. 13 is a sectional view taken along the line 13—13 of Fig. 12.

Each pair of belts 648b is provided with an idler pulley 661 that is mounted between a pair of spaced blocks 662 (Fig. 13) that are adapted to slide longitudinally along a pair of guide and supporting rods 663. The spaced blocks 662 are connected along their upper edges by a plate 664, the rods 663 passing through the apertures in the blocks 663 and the connecting plate 664. Framing members 665 and 666 support the lower and upper ends respectively of the rods 663. The lower framing member 665 is connected to the spaced angle members 584, whereas the upper framing member 666 is supported between upright legs 578 of the frame 577 (see Fig. 8). An adjusting screw 667 is threaded into the framing member 666 and projects beyond the framing member so as to engage the connecting member 664 (Fig. 13). Thus each pulley 661 may be moved longitudinally along these supporting rods 663 by adjustment of its screw 667 thereby adjusting the pressure of each idler pulley 661 against its respective pair of belts 648b (see Fig. 12). A nut 668 on the adjusting screw 667 locks the position of the screw after the adjustment has been made.

The drum indicated at 669 in Fig. 6 is journalled between the angle members 584 at a position below the upper drum 650. This lower drum 669 is grooved so as to provide a support for the plurality of pairs of belts 648a in a manner similar to the upper support for the belts 648b. This lower drum 669 is likewise adjustable by means applied by a mechanism generally indicated at 670, but since this mechanism is similar in operation to the adjustable bearing indicated at 654 in Fig. 12 a more complete description is believed unnecessary. Thus the lower belts 648a are carried between upper and lower drums 619 and 669 and a plurality of idler pulleys 671 are provided to adjust the tension in the belts 648a. These lower idler pulleys 671 are similar to the upper pulleys 661 described in connection with Fig. 12 and are likewise adjustable as previously described.

Thus there are provided upper and lower conveyor belts 648b and 648a respectively, they being arranged so that alternate pairs of belts are inclined upwardly and downwardly respectively.

As best shown in Figs. 6 and 7 a supporting bracket 672 is fastened to each of the longitudinal angle members 581 and a rotatable shaft 673 is journalled in these spaced brackets 672. Mounted on the shaft 673 are a plurality of guide rollers 674 and these guide rollers are spaced between the pairs of belts 648a. Between each pair of guide rollers 674 is a V-notched drum portion indicated in Fig. 7 at 675 upon which the corresponding pair of V-belts 648a is adapted to ride. Thus there is provided a support with guides for the V-belts 648a in the region substantially midway between their opposite end supports. Similarly an intermediate support and guide member generally indicated at 676 is provided for the upper V-belts 648b, this member being supported on spaced brackets 677 that are mounted on the upper spaced angle members 584.

Mounted above the V-belts 648a and 648b are cooperating guide belts 678a and 678b. The guide belts 678a are mounted at one end over pulley drums 679 (Fig. 8) that are mounted on the shaft 602 and are disposed with one pulley drum 679 disposed between each pair of adjusting slitter discs 618. Each pulley drum 679 is grooved to receive a pair of guide belts 678a. The lower ends of the guide belts 678a are supported by a drum 680 (see Fig. 6) that is journalled in adjustable bearing members 681 that are mounted on the frame 577. The bearing members 681 are provided with take-up provisions including the adjusting mechanism 682 that is similar to the adjustable mechanism illustrated by members 657 to 660 inclusive in connection with Fig. 12. Thus the relative spacing between the lower drum 680 and the upper shaft 602 can be adjusted so as to insure proper tension in the guide belts 678a.

Similarly the upper guide belts 678b are supported at their lower ends on pulley drums 679 that are carried on the shaft 602 and the upper ends of these guide belts 678b are supported on a drum 683 that is mounted in adjustable bearings 684 adjacent to the top of the frame 577. These adjustable bearings 684 are likewise provided with a tension mechanism 685 for adjusting the tension in the belts 678b.

The relationship of the guide belts 678a and 648a is such that there is a pair of guide belts 678a disposed directly over each pair of V-belts 648a. Similarly there is provided a pair of guide belts 678b directly over each pair of V-belts 648b.

Referring now to Figs. 6 and 8 there is provided on the end of shaft 620 a drive sprocket 686. Above the sprocket 686 is an idler sprocket 687 that is mounted on a stub shaft 688 that is journalled in a bearing plate 689. This bearing plate 689 is secured to the upper angle member 584 of the frame 577. It is to be noted that though the stub shaft 688 is disposed in alignment with the shaft 602 it is independent thereof with the idler sprocket 687 and may rotate entirely independent of the shaft 602. A sprocket chain 690 is adapted to operate over the drive sprocket 686 and the idler sprocket 687 and this sprocket chain 690 passes over a motor driven sprocket (not shown) that may be disposed below the slitter and separator machine. A lower idler sprocket 691 is journalled in an adjustable bearing plate 692 that is slotted as at 693 and thereby adjustably supported for horizontal movement on pins 694. The sprocket chain 690 passes over the idler sprocket 691 and tension in the sprocket chain 690 can be adjusted by adjusting the position of the adjustable bearing plate 692 and hence the position of the idler sprocket 691.

Thus it is seen that V-belts 648a and 648b are powered by rotation of the shaft 620 and moved in a direction so that the upper conveying portions of the belts move from the cutting drum 619 to their distant drums 669 or 650 as the case may be, while the lower portions of the guide belts 678a and 678b move in the same directions so that the adjacent portions of the belts 648a and 678a or 648b and 678b are adapted to move in the same direction. Since the guide belts 678a and 678b are powered by the shaft 602 they are in motion at all times when the slitter discs 618 are operating. The V-belts 648a and 648b however are powered from the sprocket chain 690 operating about the drive sprocket 686 and consequently V-belts 648a and 648b are driven independently of the slitter discs 618 and may be stopped in their operation while the slitter discs 618 are allowed to continue operating.

At the discharge end of the slitter and separator unit 575 are lower and upper conveyor units generally indicated at 695a and 695b respectively. Each of these conveyor units 695a and 695b comprises a plurality of rollers 696 that are disposed in parallel spaced relationship as best shown in Figs. 6, 7 and 12. These rollers 696 are journalled in spaced bearing plates 697 that are supported on the upright supporting plates 649. Each of the rollers 696 is provided with a drive sprocket 698 that is disposed adjacent to one end of the roller, and as shown the sprockets for the first, third, fifth and seventh rollers 696 are mounted adjacent to one side of the machine, whereas the sprockets for the second, fourth and sixth rollers are mounted adjacent to the opposite side of the machine. A drive sprocket 699 is mounted on a shaft 699a that is journalled in the spaced upright supporting members 649 a position below the corresponding bearing plate 697. A sprocket chain 700 is adapted to operate about the drive sprocket 699 and passes over the corresponding sprocket wheels 698 carried by the rollers 696. Thus all of the rollers 696 are powered through the drive sprocket wheels 699 and each of the drive sprocket wheels 698 is driven by a sprocket chain 701 that operates about a sprocket wheel 702 mounted on the shaft 699a of the drive sprocket wheel 699. The drive chain 701 is motor driven as will be brought out hereinafter.

Thus there is provided a slitter and separator machine that is adapted to receive an endless sheet of candy from the belt conveyor 107 and slits this sheet into strips of candy that correspond in width with the width of candy bars. This machine then separates these endless strips alternately into ribbons or strips that are conveyed to lower and upper elevations by means of declined and inclined V-belts 648a and 648b so that when these strips reach the conveyor units 695a and 695b they are disposed with the adjacent ribbons at each level spaced apart at a distance corresponding to the width of one ribbon or strip of candy. These endless ribbons are then conveyed by the conveyor units 695a and 695b to the slicer 113 (Fig. 3) that is disposed at station D.

If during the operation of the slitter and separator, it is desired at any time to halt movement of the candy through the machine, the V-belts 648a and 648b may be stopped by ceasing the operation of the drive through the sprocket chain 690. If the sheet of candy however is in contact with the slitter discs 618 during the period when the advancement of the candy through the machine is halted, it is desirable that the slitter discs 618 continue to rotate in order to prevent sticking of the candy to the discs. This is readily accomplished because the drive for the slitter discs 618 is entirely independent of the drive for the V-belts 648a and 648b.

From the upper and lower bar conveyor units 695a and 695b respectively the ribbons or strips of candy are introduced into the bar slicer that is indicated at station D in Figs. 2 and 3.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A conveyor for supporting an elongated sheet of dough, rotary knives disposed above and spaced across the conveyor for dividing the dough into strips, a rotatable cutting drum directly below the rotary knives and extending across the conveyor, the knives cooperating with the cutting drum to form bites therebetween, dough strip supporting belts extending in a forward direction with respect to the conveyor from beneath the spaces between the knives and commencing substantially directly below the axis of the rotary knives, there being a separate belt for each space so that there are a plurality of dough strip supporting belts spaced across the conveyor, the belts extending alternately to two different levels.

2. Apparatus for slitting a continuous sheet of dough into separated strips comprising a rotatable drum over which the dough passes, a plurality of spaced rotary knives disposed above said drum and cooperating therewith to form bites therebetween, a plurality of belt conveyor means passing around said drum, a separate conveyor means being provided between each adjacent pair of bites and adapted to convey a dough strip away from said drum, alternate conveyor means extending from said drum in an upwardly inclined direction, the intermediate conveyor means extending from said drum in a downwardly inclined direction.

3. The combination of claim 2 wherein said drum and said associated conveyor means are driven from one driving source and said rotary knives are driven from another driving source whereby operation of the former may be stopped independently of stopping operation of the latter.

ROBERT F. MORRISON.

References Cited in the file of this patent

UNITED STATES PATENTS

| Number | Name | Date |
| --- | --- | --- |
| 1,039,795 | Pfenninger | Oct. 1, 1912 |
| 1,527,262 | Martin | Feb. 24, 1925 |
| 1,949,835 | James | Mar. 6, 1934 |
| 2,080,113 | Cloud | May 11, 1937 |
| 2,113,575 | Decker | Apr. 12, 1938 |
| 2,215,575 | Bowman | Sept. 24, 1940 |
| 2,248,688 | Petrovic | July 8, 1941 |
| 2,256,927 | Pittman | Sept. 23, 1941 |
| 2,282,525 | Maguire | May 12, 1942 |
| 2,425,356 | Sticelber | Aug. 12, 1947 |
| 2,454,316 | Haecks | Nov. 23, 1948 |